Figure 1:
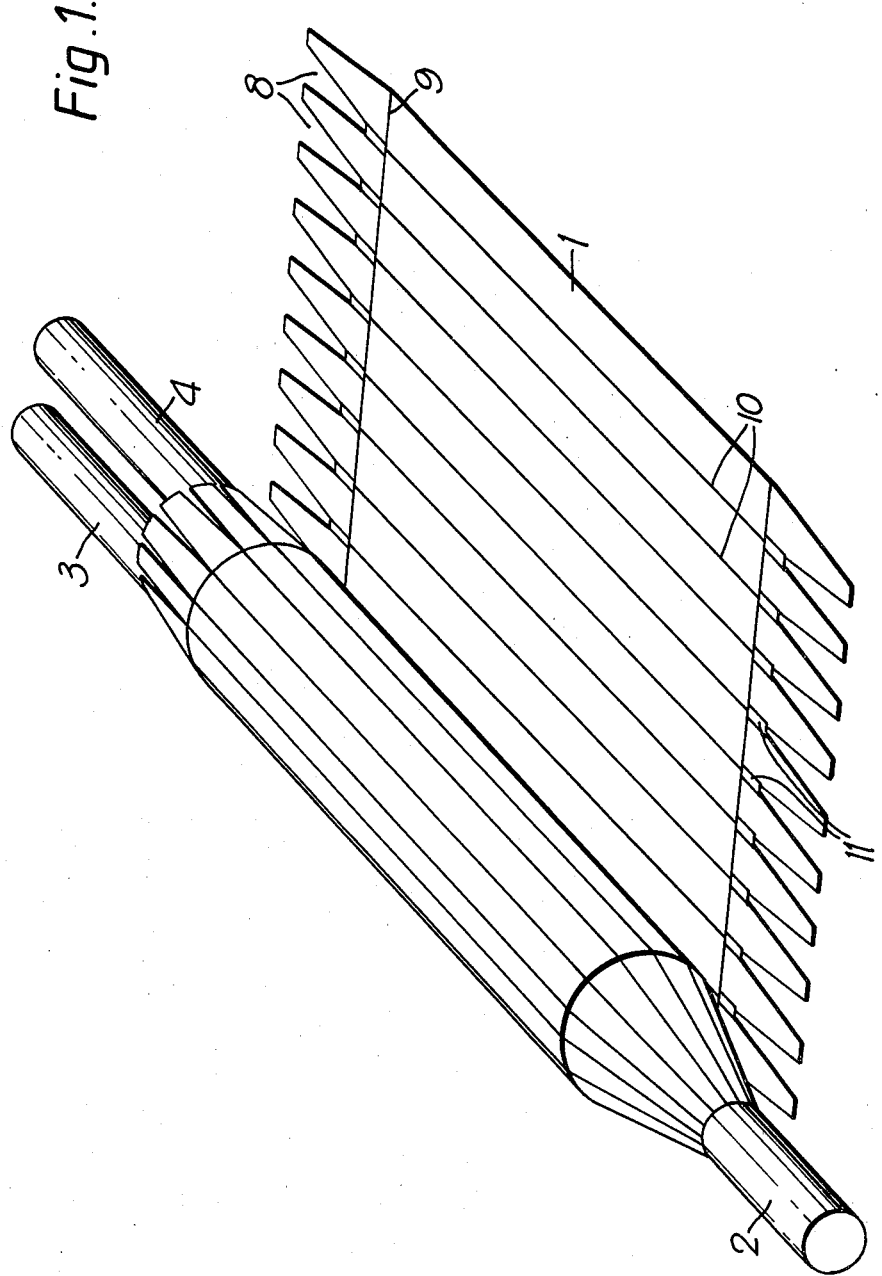

United States Patent [19]

Moisson

[11] 4,380,686
[45] Apr. 19, 1983

[54] CABLE SLEEVE LINER

[75] Inventor: Marc F. L. Moisson, Strombeek, Belgium

[73] Assignee: N.V. Raychem S.A., Kessel-lo, Belgium

[21] Appl. No.: 94,815

[22] Filed: Nov. 16, 1979

[30] Foreign Application Priority Data

Sep. 11, 1979 [GB] United Kingdom ............... 7931402

[51] Int. Cl.³ ..................... H01R 4/70; H02G 15/18
[52] U.S. Cl. ........................ 174/84 R; 174/DIG. 8; 428/167; 428/464; 428/486
[58] Field of Search ............... 174/92, 84 R, DIG. 8; 428/458, 464, 481, 486, 535, 167, 220, 213, 215, 332, 337, 339

[56] References Cited

U.S. PATENT DOCUMENTS

| | | | |
|---|---|---|---|
| 2,133,357 | 10/1938 | Mazer | 428/167 |
| 2,774,698 | 12/1956 | Jenk et al. | 428/535 |
| 3,054,703 | 9/1962 | Brasure | 428/458 |
| 3,355,348 | 11/1967 | Lamar | 428/464 |
| 3,428,591 | 2/1969 | Lewis | 428/486 |
| 3,488,252 | 1/1970 | Lamar | 428/464 |
| 3,589,975 | 6/1971 | Andrews et al. | 428/458 |
| 3,620,896 | 11/1971 | Glassow | 428/167 |
| 3,647,603 | 3/1972 | Esemplare et al. | 428/464 |
| 3,879,574 | 4/1975 | Filreis et al. | 174/92 |
| 3,900,644 | 8/1975 | Sackoff et al. | 428/481 |
| 3,972,467 | 8/1976 | Whillock et al. | 428/215 |

FOREIGN PATENT DOCUMENTS

| | | |
|---|---|---|
| 7805026 | 3/1978 | Fed. Rep. of Germany . |
| 1088055 | 10/1967 | United Kingdom . |
| 1376038 | 12/1974 | United Kingdom . |

*Primary Examiner*—William R. Dixon, Jr.
*Attorney, Agent, or Firm*—Lyon & Lyon

[57] ABSTRACT

The present invention relates to improved liner constructions, and accordingly provides a cable sleeve liner capable in use of being wrapped around a cable splice and preferably having sufficient rigidity to provide an inner support for a heat-recoverable sleeve to be shrunk thereover, the liner comprising a laminate having at least one layer of fibrous sheet material and a metal layer which is substantially impermeable to moisture vapor and has one of its major surfaces facing away from all fibrous sheet layers which may be present. Preferably the fibrous layer(s) is or are arranged between the metal layer and a microperforated first layer of flexible polymeric film material which is permeable to gases or vapors generated within the laminate during recovery of the sleeve.

9 Claims, 3 Drawing Figures

CABLE SLEEVE LINER

DESCRIPTION

This invention relates to a cable sleeve liner capable in use of being wrapped around a cable and having sufficient rigidity to provide an inner support for a heat-recoverable sleeve to be shrunk thereover in use.

Cable sleeves and liners of this general kind are known, and are particularly useful for forming splice cases on telecommunication cables. Known liners formed of aluminium foil sandwiched between two layers of stiff cardboard tend to suffer from delamination of the constituent layers, and tend to permit ingress of moisture into the splice case by capillary transfer ("wicking") along the cardboard to the ends of the liner where the moisture can pass around the metal foil edge.

The present invention relates to improved liner constructions, and accordingly provides a cable sleeve liner capable in use of being wrapped around a cable splice and preferably having sufficient rigidity to provide an inner support for a heat-recoverable sleeve to be shrunk thereover, the liner comprising a laminate having at least one layer of fibrous sheet material and a metal layer which is substantially impermeable to moisture vapour and has one of its major surfaces facing away from all fibrous sheet layers which may be present. Preferably the fibrous layer(s) is or are arranged between the metal layer and a microperforated first layer of flexible polymeric film material which is permeable to gases or vapours generated within the laminate during recovery of the sleeve.

This construction according to the invention advantageously enables the metal layer to be positioned on the outside of the liner in use, to act as a moisture barrier to resist ingress of delaminating moisture. The preferred first polymeric film layer preferably tends to resist gross wetting from the other side (which may occur for example during storage or application of the liner), whilst still permitting escape of vapours or gases generated within the laminate at elevated temperatures encountered in use, which vapours or gases might otherwise themselves cause delamination.

Preferably the surface of the film furthest from the metal layer is covered with water-proofing substantially moisture-impermeable material, which becomes substantially more vapour permeable at elevated temperatures encountered during recovery, so as not to hinder the aforesaid escape of vapours or gases. It is additionally advantageous if the water-proofing material returns to a substantially moisture-impermeable state on cooling. Wax coatings and polyvinyl chloride films are preferred for this water-proofing material, which improves the resistance of the liner to accidental contamination in wet or muddy conditions frequently encountered in use.

For added resistance to bending stresses, it is preferred to include a second layer of flexible polymeric film material, preferably polyester film, between the metal layer and the fibrous layer, and this second polymeric film layer should also be vapour permeable in cases where there is a further fibrous layer between the second polymer layer and the metal layer. Double layers of fibrous sheet material can be used if desired, for example, in a preferred construction a double layer of fibrous sheet material is arranged between the first and second polymer film layers.

The surface of the metal layer facing away from the fibrous layer(s) is most advantageously on the outside of the liner as wrapped around a cable splice in use, and may carry a protective layer of flexible polymeric film material, e.g. polyethylene, preferably at least 20 microns thick.

The first and second layers of flexible polymeric film material within the laminate are preferably polyester film e.g. "Mylar" film (Registered Trade Mark). In some cases it may be possible to use a microporous film, the microporosity providing the necessary permeability to gases and vapours, but usually it will be necessary to use a perforated, epecially a micro perforated, film. The perforations in the film are preferably no more than 2 mm in diameter, and most preferably are from 0.5 to 1.5 mm in diameter. Preferably there are on average from 5 to 15 perforations on each square cm of the film. The layer(s) of film material is or are preferably 35 to 45 microns thick.

The fibrous sheet material is preferably a non-woven cellulosic material, pressboard being most preferred, although other non-woven cellulosic materials such as cardboard may also be used. Each layer fibrous sheet material is preferably 250 to 350 microns thick.

The metal layer is preferably aluminium foil and is preferably 25 to 35 microns thick.

Liners embodying the present invention will now be described by way of example with reference to the accompanying drawings these examples also illustrating convenient folding lines and slotted edges which are generally desirable features of the liners to which the present invention relates.

Figure 2:
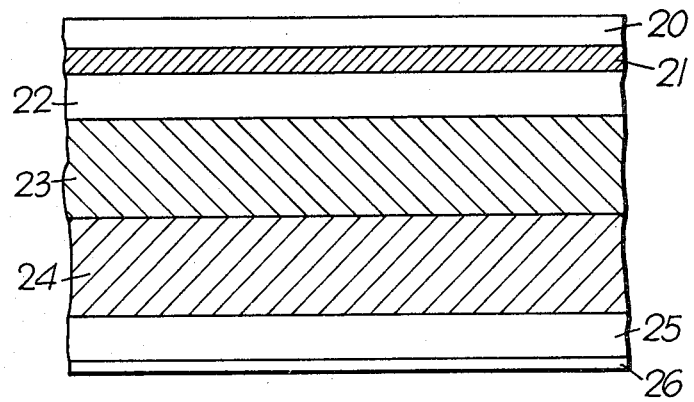
Figure 3:
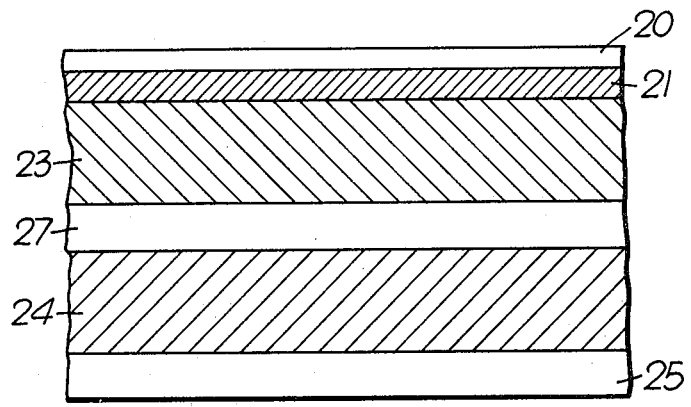

In the drawings,

FIG. 1 shows a liner according to the present invention in position around a cable splice and FIGS. 2 and 3 respectively illustrate first and second laminate constructions for the liner.

In FIG. 1, the liner 1 has parallel folding lines 10 of increased flexibility to facilitate wrapping around the splice in the cables 2, 3, 4. This has the advantage that the liner material itself may be made stiffer to enhance that support of the heat-recoverable sleeve while maintaining adequate transverse flexibility of the liner as a whole. The liner edges which are at the ends of the splice, have slots 8 to permit tapering of the liner around the spliced cable, as shown at the single-cable end, the figure showing the preferred tapering form of these slots and transverse folding lines 9 which may be used if necessary to facilitate the bending of the liner to fit the cables. At the apex of each tapering slot there is provided a short cut-out portion 11 which is bent inwardly to avoid the formation of a sharp corner when the liner is wrapped around the splice.

The liner shown in FIG. 1 may have the laminated structure shown in FIG. 2, in which 20 is a layer of polyethylene of thickness 30μ 21 is a 30μ thick layer of aluminium, 22 is a 40μ thick layer of "Mylar" (Registered Trade Mark) polyester, 23 and 24 are layers of pressboard 300μ thick, 25 is a 40μ thick layer of microperforated "Mylar" polyester, perforations 1 mm in diameter, there being 9 perforations per sq. cm of film, and 26 is a wax coating which becomes permeable to vapours and gases at temperatures above 90° C.

This laminate maybe made by extruding the polyethylene layer on to the aluminium, and calendaring a layer of Mylar film onto a layer of pressoboard, using a solvent-based adhesive. Two layers of the Mylar/pressboard laminate and a layer of the polyethylene/aluminium laminate are then calendered together to make the illustrated construction. Finally the perforations are made in the exposed Mylar film layer and a layer of wax sprayed thereon.

An alternative laminate structure is shown in FIG. 3, wherein 20, 21, 23, 24 and 25 are the same as in FIG. 2, 27 is a further 40μ thick layer of microperforated Mylar polyester similar to 25. This laminate may be made by a process similar to that described above. Any other suitable process may of course be used for the manufacture of the laminates, for example the aluminium may be vapour-coated onto the other layers.

Liners according to the invention can provide, together with an outer heat recoverable sleeve, an improved protection for a cable splice. If desired, the strength of the liner may be further improved by the provision of reinforcing profiled grooves in the liner, preferably so arranged that they extend longitudinally when the liner is wrapped around the cable splice.

I claim:

1. A cable splice case comprising a cable sleeve liner wrapped around a cable splice and a sleeve surrounding the wrapped liner, said cable sleeve liner comprising a laminate having at least one layer of a fibrous non-woven cellulosic sheet material between a metal layer which is substantially impermeable to moisture vapour, said metal layer having one of its major surfaces facing away from all fibrous sheet layers present in the liner, and a microperforated first layer of flexible polyester film material which is vapour-permeable to permit escape of gases or vapours generated within the laminate during recovery of the sleeve.

2. A splice case according to claim 1, wherein the sleeve is made of heat-shrinkable material.

3. A splice case according to claim 2, wherein the sleeve has been heat-shrunk onto the liner.

4. A cable splice case according to claim 1, wherein the laminate has a second layer of flexible polymeric film material between the metal layer and the layer of fibrous non-woven cellulosic sheet material.

5. A cable splice case according to claim 4, wherein there is a second layer of fibrous sheet material between the second flexible polymeric film layer and the metal layer, and the second flexible polymeric film material is a microperforated vapour permeable film material.

6. A cable splice case according to claim 4, wherein there are two layers of fibrous non-woven cellulosic sheet material between the first layer of microperforated flexible polyester film material and the second layer of flexible polymeric film material.

7. A cable splice case according to claim 1, wherein there is a protective layer of flexible polyethylene film material overlying the surface of the metal layer which is remote from the layer of fibrous non-woven cellulosic sheet material.

8. A liner according to claim 7, wherein the said protective layer is at least 20 microns thick.

9. A cable splice case according to claim 1, wherein the surface of the flexible polyester film material which is furthest from the metal layer is covered with a wax coating or a film of polyvinyl chloride which becomes substantially more vapour permeable at elevated temperatures.

* * * * *